Aug. 3, 1965        LE ROY T. CUSHMAN         3,199,047
SIGNAL GENERATOR
Filed Aug. 21, 1961
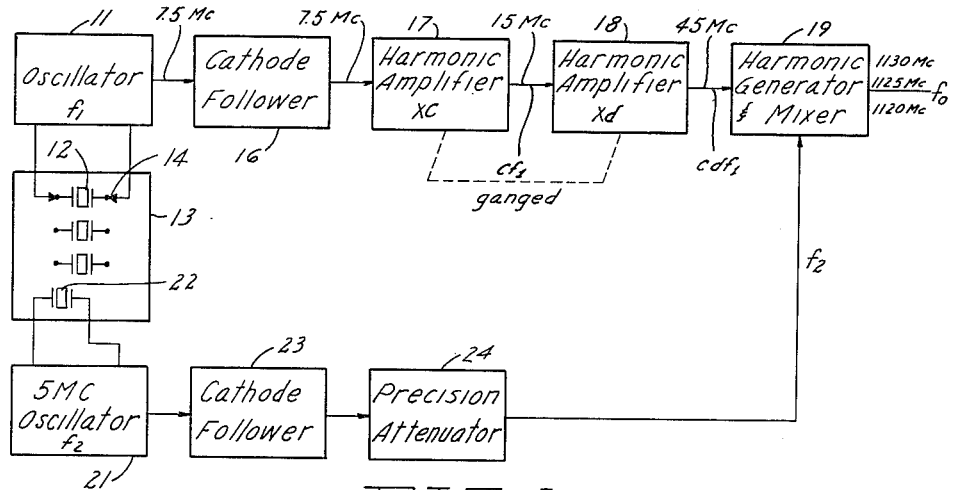
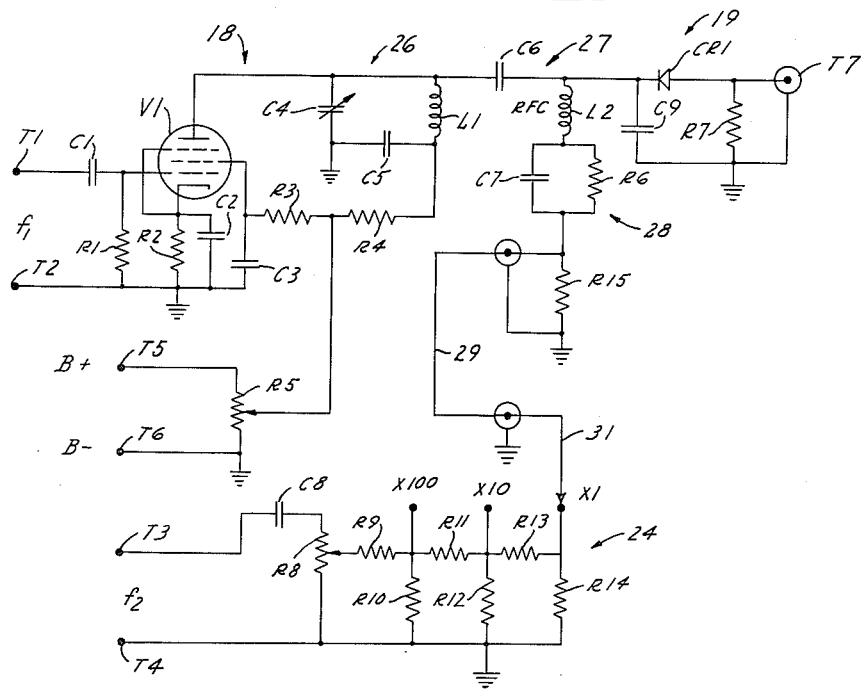
INVENTOR.
Le Roy T. Cushman.
BY
ATTORNEYS.

United States Patent Office 3,199,047
Patented Aug. 3, 1965

3,199,047
SIGNAL GENERATOR
Le Roy T. Cushman, 11761 Los Arboles, Sunnyvale, Calif.
Filed Aug. 21, 1961, Ser. No. 132,793
3 Claims. (Cl. 331—40)

This invention relates to a signal generator and more particularly to a precision frequency generator which is used for generating precision frequency side bands having adjustable amplitudes.

At the present time there is a need for a multi-channel frequency monitor which can be utilized with two-way communication systems to measure the transmitter frequency and deviation in compliance with FCC regulations. In particular, it is desirable to measure the frequency of the transmitter and also measure the FM devitation of that frequency or, in other words, how much band width the transmitted frequency is occupying in the spectrum as it is being modulated. In addition, there is a need for an instrument of this type which will supply to a receiver associated with the transmitter a directly calibrated output of precisely the FCC assigned frequency and with an output which is directly adjustable so that the output has a known signal level. Such a signal frequency of known amplitude is very useful in checking receivers in the two-way system to determine whether or not they are operating properly. A single portable instrument having these features with the required accuracy has not been available. In supplying such an instrument, there is a requirement for a signal generator which will provide precision frequencies with precision side bands.

In general, it is an object of the present invention to provide a signal generator that can be used as a precision frequency generator which generates precision frequency side bands on a predetermined frequency.

Another object of the invention is to provide a signal generator of the above character in which precision side band frequencies are generated by beating the precision low frequency against the precision high frequency and its harmonics.

Another object of the invention is to provide a signal generator of the above character in which the low frequnecy has a controllable or adjustable amplitude.

Another object of the invention is to provide a signal generator of the above character in which a precision attenuator is provided in the low frequency circuit.

Another object of the invention is to provide a signal generator of the above character in which the vacuum tubes utilized can be interchanged with no appreciable effect on the accuracy performance of the signal generator.

Another object of the invention is to provide a signal generator of the above character in which the precision side band frequencies are precisely adjustable in amplitude to provide known amounts of output voltage.

Additional objects and features of the invention will appear from the following description in which the preferred embodiment is set forth in detail in conjunction with the accompanying drawing.

Referring to the drawing:

FIGURE 1 is a block diagram of a signal generator incorporating my invention.

FIGURE 2 is a detailed circuit diagram of a typical signal generator incorporating my invention.

In general, my signal generator consists of means for generating a first precision frequency and means for generating a second precision frequency. Means is connected to the first precision frequency and to the second precision frequency for generating a signal which is rich in harmonics and for generating desired precision side band frequencies above and below a predetermined frequency differing in frequency from the predetermined frequency by a frequency equal to the second precision frequency. In addition, precision attenuator means is provided for precisely attenuating the second precision frequency to thereby precisely adjust the amplitude of the precision side band frequencies.

A block diagram of my signal generator is shown in FIGURE 1. It consists of an oscillator 11 which generates the local oscillator frequency $f_1$. This frequency $f_1$ is determined by one of a plurality of precision crystals 12 mounted in a constant temperature oven 13. The desired crystal is selected by switch means 14 and connect to the oscillator 11. The output of the oscillator 11 is fed into a cathode follower 16 which transforms the voltage available from the oscillator circuit 11 into a signal with substantial power gain in a manner well known to those skilled in the art. The cathode follower 16 serves to isolate the oscillator 11 and provide an output which has a low impedance. It, therefore, permits the oscillator to operate in a precision manner to provide a precision frequency as determined by the crystal 12 connected to the oscillator.

The output of the cathode follower may be supplied to one or more harmonic amplifiers as required. For example, as shown in FIGURE 1, two harmonic amplifiers 17 and 18 are provided which operate on harmonics of the fundamental frequency $f_1$. For example, as shown, the harmonic amplifier 17 can operate on the second harmonic of the output which can be called a multiplier of $c$ from the cathode follower 16, whereas the second harmonic amplifier 18 can operate on the third harmonic of the output which can be called a multiplier of $d$ from the harmonic amplifier 17 to thereby multiply the fundamental frequency $f_1$ by six.

The harmonic amplifiers 17 and 18 are ganged as shown so they can be tuned simultaneously.

The output of the harmonic amplifier 18 has a frequency $cdf_1$ which is coupled to the harmonic generator and mixer 19 which supplies a predetermined or desired harmonic frequency $f_0$. This desired generated harmonic of the fundamental frequency $f_1$ generated by the oscillator 11 is chosen in one use of my signal generator so that it will be precisely 5 mc. below the FCC assigned transmitter or receiver frequency.

Another precision frequency $f_2$ is supplied to the harmonic generator and mixer 19 as shown in FIGURE 1. This second precision frequency is generated in an oscillator 21, the output frequency of which is precisely controlled by a crystal 22 within the constant temperature oven 13. The output of the oscillator 21 is supplied to a cathode follower 23 which serves the same purpose as the cathode follower 16 and supplies a precision frequency of substantial power to a precision attenuator 24. The output of the precision attenuator 24 is supplied to the harmonic generator and mixer 19 as hereinbefore described. This frequency $f_2$ is then beat or mixed with the frequency $cdf_1$ supplied to the mixer 19 and its harmonics produced by the mixer 19 and particularly with desired harmonic frequency to provide sidebands for each freqency differing in frequency from each of the frequencies by a frequency precisely equal to the frequency $f_2$. The amplitude of these precision side band frequencies can be precisely controlled or adjusted by the precision attenuator 24 as hereinafter described. More particularly, the frequency $cdf_1$ in passing through the harmonic generator and mixer 19 generates harmonics in a manner well known to those skilled in the art as $cdf_1$.

$$cdf_1 \times 1, \ cdf_1 \times 2, \ cdf_1 \times 3 \ \ldots \ cdf_1 \times n$$

When dicrete amounts of frequency $f_2$ are coupled to the harmonic generator and mixer 19 the following sidebands $$cdf_1 \times n, \ cdf_1 \times n \pm 2f_2, \ cdf_1 \times n \pm 3f_2 \ \ldots \ cdf_1 \times n \pm mf_2$$

In summary it can be stated that to generate an assigned frequency with my signal generator, a particular harmonic of one of the crystal oscillator frequencies from the oscillator 11 is mixed in the harmonic generator 19 with discrete amounts of a crystal controlled 5 mc. signal $f_2$. The amplitude of the resultant generated assigned frequency is controlled by the 5 mc. precision attenuator 24 to allow a directly calibrated output. A primary advantage of this circuit is that the signal output attenuator is always working at 5 mc. and not at another frequency. In this way, the attenuator does not introduce any frequency error effect when the signal generator supplies a generated signal which may vary all the way from 25 mc. through 1000 mc. and beyond.

By way of example let it be assumed that it is desired to generate a signal $f_0$ of 1130 mc. with the circuit shown in FIGURE 1. In such a case the crystal 12 would be selected so that the oscillator would produce a precise frequency of 7,500.0000 kc. $f_1$. The output from the harmonic amplifier 17 which acts as a doubler would be 15.0000 mc. ($cf_1$) and the output from the harmonic amplifier 18 which acts as a tripler would be 45.0000 mc. ($cdf_1$) The harmonic generator and mixer 19 would then produce a 25th harmonic of this frequency which would be precisely 1125.0000 mc. ($cdf_1 \times n$). Then assuming that the frequency $f_2$ is precisely 5000.000 kc., the mixing action in the harmonic generator and mixer 19 would produce a difference frequency and a sum frequency of 1120.000 mc. ($cdf_1 \times n - f_2$) and 1130.000 mc. ($cdf_1 \times n + f_2$). The output amplitude of the signal $f_0$ at 1130.000 mc. is directly controlled by the action of the precision attenuator 24 for the frequency $f_2$ and the accuracy of the amplitude of the output will be the same proportionally as that present in the side bands at 40.0000 and 50.0000 mc.

A detailed circuit diagram of a typical signal generator is shown in FIGURE 2. Certain of the components which are shown in block diagram in FIGURE 1 have been omitted from the detailed circuit diagram shown in FIGURE 2 because they are substantially conventional. Thus the oscillator 11 and the cathode follower 16 have been omitted and the precision frequency output from the cathode follower or any ensuing harmonic amplifiers is shown being supplied to the terminals T1 and T2 to a harmonic amplifier stage 18. In this embodiment only one harmonic amplifier stage is shown and it can be utilized for doubling, tripling, quadrupling or further multiplying the frequency $f_1$ as desired.

The stage 18 includes a vacuum tube V1 of a conventional type such as a five element vacuum tube which includes plate, cathode, control grid, screen grid and suppressor grid elements arranged in a conventional manner. The frequency $f_1$ is coupled to the control grid of the vacuum tube V1 by a coupling capacitor C1. A resistor R1 serves as a ground return for the control grid so that if the control grid should be driven by a substantial RF voltage, a bias is developed on the control grid to cause the tube V1 to operate as a class C amplifier. The resistance R2 develops a cathode-to-ground voltage which provides, in effect, a control grid-cathode bias to limit plate and screen current in the event that no RF drive should be present on the control grid. Thus, the resistor R2 establishes a certain amount of bias on the tube V1 and thus limits the amount of current the screen and plate can draw so that the tube is not damaged. A capacitor C2 is provided connecting the cathode to the ground. It offers a very low reactance to the input signal frequency so as to prevent degeneration. A capacitor C3 connects the screen grid to ground and serves to prevent the screen grid from assuming an A.C. or RF potential. The suppressor grid of the tube is connected to the cathode in a conventional manner.

A B+ voltage of a suitable value such as 30 volts D.C. is applied to the terminal T5 and is applied across a multi-turn potentiometer R5. A suitable voltage is picked off by the wiper of the potentiometer R5 and is applied to the screen grid through a screen grid dropping resistor R3. The B+ voltage is also applied to the plate of the tube through a resistor R4 and through the inductor L1. A capacitor C4 is coupled in parallel with the inductor L1 to provide a parallel resonant tuned circuit 26 for determining the frequency at which the stage 18 will be resonated. A capacitor C5 is connected in the parallel tuned circuit between one end of the inductor L1 and the adjustable capacitor C4 and is provided for the purpose of keeping the bottom end of the inductor L1 at RF ground potential. The RC network consisting of the resistor R4 and the capacitor C5 serves to attenuate any signals passing into the power supply from the tuned circuit established by the inductor L1 and the capacitor C4. In other words, the RC network serves as a decoupling network.

The output circuit from the harmonic amplifier 18 is then applied to the harmonic generator and mixer 19 which includes a diode CR1. This same frequency is also connected to one end of inductor L2 which serves as radio frequency choke (RFC) at the frequency supplied by the output from the harmonic amplifier stage 18. In other words, the inductor L2 has a very high reactance to the output frequency from the stage 18 and therefore does not shunt or in any way effect the resonant condition of the inductor L1 and capacitor C4. Inductor L2 is an RF choke whose reactance is high at the operating frequency range of the resonant circuit 26 consisting of the inductor L1 and the capacitor C4. As hereinafter described, it also provides a D.C. return for current generated by rectification in the diode CR1.

The diode CR1 is connected to the coaxial output terminal T7. The diode CR1 is also connected to ground through a resistor R7 which determines the actual low output impedance for matching the impedance of the coaxial cable termination provided at terminal T7. A capacitor C9 connects the input side of the diode CR1 to ground and is physically located near to diode CR1 to provide a relatively low A.C. impedance for impedance matching at microwave frequency harmonics which might be attenuated by the lead length from the elements C4, L1 and C6, all of which are connected to diode CR1.

The inductor L2 is connected to ground through an RC network 28 consisting of a resistor R6 and a capacitor C7 and a resistor R15 connected in series with the RC network. The resistor R6 serves as a diode biasing resistor as hereinafter described and the capacitor C7 serves as a coupling capacitor for frequency $f_2$. The resistor R15 provides a low impedance termination for matching the coaxial line 29.

As explained in conjunction with the block diagram, the precision second frequency $f_2$ is supplied to the harmonic generator and mixer 19. Again the circuitry for the blocks 21 and 23 has been omitted because it is substantially conventional. The output frequency $f_2$ from the cathode follower 23 is supplied to the precision attenuator 24 which is shown in detail in FIGURE 2. As explained previously, the purpose of the attenuator is to provide a precisely controlled amplitude for the frequency $f_2$. The capacitor C8 is a D.C. blocking capacitor and is provided for the purpose of preventing any D.C. from the preceding driving circuit from appearing across the potentiometer R8. The network of resistors consisting of R9, R10, R11, R12, R13, and R14 are provided to provide a progressive decrease in the amplitude of the signal frequency $f_2$. As can be seen, the resistors have been chosen so that three separate take-off points are provided for a movable contact 31 and are shown as X100, X10, and X1 to give 20 db of attenuation as seen across the resistor R15 in going from one position to the next.

Operation of the circuit shown in FIGURE 2 may now be briefly described as follows: Let it be assumed that a frequency $f_1$ is being supplied to terminals T1 and T2 and a frequency $f_2$ is being supplied to the terminals T3 and T4. Because the tube V1 is being supplied with a very low plate voltage which can be adjusted from zero to approximately +30 volts through the use of the potentiometer R5, the tube V1 operates as a limiter. The tube V1 is normally driven by a substantial RF voltage at its control grid by the signal frequency $f_1$ so that the tube is operating as a Class C amplifier in which it is either drawing a large amount of current or it is completely cut-off. For this reason, the output of the tube V1 is a function of the B+ voltage applied to its screen and to its plate by the potentiometer R5. Since this is true it makes it possible to interchange or replace the tubes without having any noticeable effect upon the circuitry to thereby assume constant RF output of the circuit. In addition because of the manner in which the tube V1 is operated, the circuit is not effected by any normal variations in line voltage.

The precision high frequency output from the tuned circuit 26 of the stage 18 is then applied to the diode CR1 through the coupling capacitor C6. When RF voltage is applied to the diode CR1, it conducts when the polarity is proper with respect to the diode. This current which is conducted passes through the resistor R7 to ground to establish a voltage across the resistance R7. On the other one-half cycle of the RF voltage, the diode is unable to conduct due to its well known semiconductor properties. The diode CR1 is connected in such a manner that it will pass negative voltage pulses which will generate a bias which passes through the radio frequency choke and inductor L2 and through the resistor R6 and R15. Because of the current passing through this resistor R6, a bias voltage is provided which is established at the top end of the inductor L2 which in effect biases the diode so that it will not conduct until a predetermined negative voltage is applied to the diode CR1. At the time this predetermined negative voltage is exceeded by the signal from the harmonic amplifier 18, the diode CR1 will conduct and will continue to conduct until the negative voltage again drops below the predetermined bias level established at the top of the inductor L2. This action continues so that the diode CR1 produces a very distorted output which is very high in harmonics and in fact generates harmonics through and beyond the 15 kmc. region.

At the same time this harmonic generating action is occurring in the diode CR1, the second frequency $f_2$ is being injected into the diode CR1 from the attenuator 24 through the RC network 28 through the inductor L2 through the diode CR1. The capacitor C7 has very low reactance for the $f_2$ frequency. It passes the frequency through the inductor L2 through the capacitor C6, through the inductor L1 and to ground through the capacitor C5. The capacitor C7, the inductor L2, the capacitor C6, the inductor L1 and capacitor C5 form a series circuit which resonates at frequency $f_2$. Because this circuit is series resonant, it provides a signal of frequency $f_2$ to the diode CR1 which is very free of harmonics. Although this series resonant circuit is not absolutely necessary, it is desirable in that it provides a precision frequency $f_2$ which is free of all harmonics.

As the frequency $f_2$ is injected into the diode CR1, a mixing action occurs which creates side bands directly related to the frequencies involved. For the frequency $f_0$ supplied to the diode CR1 from the harmonic amplifier 18 and for each harmonic generated upwards frequency wise when mixed with $f_2$, there are created two side bands one above and one below each of the harmonic frequencies which differ from the particular frequency considered by a frequency precisely equal to the precision frequency $f_2$.

By varying the position of the contact 31 between the terminals X100, X10 and X1 and by varying the potentiometer R8, it is possible to attenuate the second injected frequency $f_2$ any desired degree. This in turn will cause a proportional attenuation of the side band output frequencies so long as the amplitudes of the applied input frequencies $cdf_1$ and $f_2$ do not exceed a level which the diode CR1 can handle without exceeding its linear capabilities.

The purpose of potentiometer R5 (ten turn potentiometer which provides extremely fine resolution and resetability) is to allow injection of a proper $cdf_1$ frequency level as developed by the V1 limiter tube to give one microvolt of precision side band generated signal when the $f_2$ attenuator 24 is set on the one microvolt or X1 position and the wiper of the potentiometer is in its uppermost position as viewed in FIGURE 2.

By way of example, a circuit constructed in accordance with FIGURE 2 had the following components and component values:

| | |
|---|---|
| Tube V1 | Type 5654. |
| C1 | 100 picofarads. |
| C2 | .002 microfarad. |
| C3 | .002 microfarad. |
| C4 | 10–140 picofarads (variable). |
| C5 | .002 picofarad. |
| C6 | 82 picofarads. |
| C7 | .002 microfarad. |
| C8 | .02 microfarad. |
| C9 | 6.8 picofarads. |
| L1 | Inductance required to resonate with capacitor C4 at operating frequency of tuned circuit 26. |
| L2 | 10 microhenrys. |
| R1 | 470K ohms. |
| R2 | 390 ohms. |
| R3 | 27K ohms. |
| R4 | 2.7K ohms. |
| R5 | 100K ohms (10 turn potentiometer). |
| R6 | 120K ohms. |
| R7 | 51 ohms—1%. |
| R8 | 50 ohms (noninductive composition potentiometer). |
| R9 | 51 ohms—1%. |
| R10 | 120 ohms—1%. |
| R11 | 495 ohms—1%. |
| R12 | 61.9 ohms—1%. |
| R13 | 495 ohms—1%. |
| R14 | 54.9 ohms—1%. |
| R15 | 56 ohms—1%. |
| Diode CR1 | Commercial Type FD 100. |

In such an embodiment two controls can be provided for attenuation, one for controlling the potentiometer R8 and the other for controlling the position of the contact 31. The potentiometer R8 can for example be calibrated directly from zero to 1 microvolt with calibration points at every 1/10 of a microvolt and the other connected to the contact 31 which allows a directly calibrated output of zero to 1, zero to 10, or zero to 100 microvolts at the desired side band frequency resulting from the mixing of frequency $cdf_1$ (or any of its harmonics) and $f_2$.

A distinct advantage of this circuitry shown in FIGURE 2 is that the attenuator is always working at the same frequency. In this manner, the attenuator itself does not introduce any frequency error effect when the signal generator supplies a generated signal through its complete range as for example from the 25 megacycle through and beyond the 1000 megacycle region. In this manner, I have been able to provide a compact, efficient and accurate attenuation system which is usable over a tremendously wide frequency range for use at discrete frequencies. Alternative methods of attenuation presently used commercially require large and expensively machined mechanical assemblies of considerable cost which precluded incorporation in my signal generator.

It is apparent from the foregoing that I have provided a signal generator which makes it possible to generate A.C. or RF frequencies through the A.C. or RF spectrums with very high accuracy going beyond the third decimal point together with means for attenuating amplitude of the discrete frequencies desired by operating the attenuator at a single frequency which differs from the desired output frequency. Thus in generating a range of frequencies, the attenuator does not operate to introduce an error of its own at the desired output frequency.

I claim:

1. In a signal generator, means for generating a first precision frequency, means for generating a second precision frequency, a diode, means connecting one terminal of the diode to ground, means including a first capacitor connecting the other terminal of the diode to the means for generating the first precision frequency, and means connecting said other terminal of the diode to the means for generating the second precision frequency, said last named means including a radio frequency choke, connected to said other terminal of the diode, a resistor in series with said radio frequency choke and a second capacitor in parallel with said resistor, means connecting said second capacitor and said resistor to said means for generating a second precision frequency, and resistive means connecting said second capacitor and said resistor to ground, said first capacitor, said radio frequency choke and said capacitor forming at least a part of a series resonant circuit which resonates at said second precision frequency to provide a signal to the diode having a frequency equal to said second precision frequency free of harmonics.

2. In a signal generator, means for generating a first signal having a preselected precision frequency, means for generating a second signal having a precision fixed frequency independent of and differing from the frequency of the first signal, means operatively connected to the means for generating a second signal for precisely attenuating the second signal, and means operatively coupled to the means for generating a first signal and to the means for attenuating the second signal for mixing said first and second signals to provide a combined signal having a plurality of precision frequencies with upper and lower precision side band frequencies separated in frequency from the frequency of the first signal by a frequency equal to the frequency of the second signal, said means operatively coupled to the means for generating a first signal and to the means for attenuating the second signal including a series resonant circuit for eliminating harmonics of the second signal, said series resonant circuit including first and second serially connected components, said first component being coupled to the means for precisely attenuating the second signal, said second component being coupled to said means for generating a first signal, the output from the junction between the first and second components being connected to the input of the means for mixing said first and second signals.

3. In a signal generator, a first crystal controlled oscillator for generating a first signal having a preselected fixed precision frequency, a first cathode follower connected to the output of the oscillator, an amplifier connected to the output of the first cathode follower, a harmonic generator and mixer, means coupling the output of the amplifier to the harmonic generator and mixer, a second oscillator for generating a second signal having a fixed precision frequency independent of and differing from the frequency of the first signal, a second cathode follower connected to the output of the second oscillator, a precision attenuator connected to the output of the second cathode follower, means connecting the output of the precision attenuator into the harmonic generator and mixer, said harmonic generator and mixer serving to mix said first and second signals to provide a combined signal having a plurality of precision frequencies with precision upper and lower side band frequencies separated in frequency from the frequency of the first signal by a frequency equal to the frequency of the second signal, said means for coupling the output of the amplifier to the harmonic generator and mixer and the means for coupling the output of the precision attenuator into the harmonic generator and mixer including a series resonant circuit for eliminating the harmonics of the second signal, said series resonant circuit including first and second serially connected components, said first component being coupled to the precision attenuator, said second component being coupled to the amplifier, the output from the junction between the first and second components being connected to the input of the harmonic generator and mixer.

References Cited by the Examiner

UNITED STATES PATENTS

| 2,555,390 | 6/51 | Bach | 331—40 |
| 2,719,231 | 9/55 | Hugenholtz | 331—19 |
| 2,776,373 | 1/57 | Mischler | 331—37 |

FOREIGN PATENTS

| 573,171 | 3/59 | Canada. |

OTHER REFERENCES

Electronics, October 1955, pages 144–145, Subaudio Oscillator Tunes 0 to 50 cycles, by Fleming et al.

ROY LAKE, *Primary Examiner.*

JOHN KOMINSKI, *Examiner.*